Nov. 23, 1965  R. L. LARSON  3,219,903
GENERATING SYSTEM WITH RECTIFIER PROTECTION MEANS
Filed July 16, 1962

INVENTOR.
Robert L. Larson
BY C. R. Meland
His Attorney

United States Patent Office 3,219,903
Patented Nov. 23, 1965

3,219,903
GENERATING SYSTEM WITH RECTIFIER
PROTECTION MEANS
Robert L. Larson, Anderson, Ind., assignor to General Motors Corporation, Detroit, Mich., a corporation of Delaware
Filed July 16, 1962, Ser. No. 209,887
9 Claims. (Cl. 320—40)

This invention relates to electrical systems and more particularly to a motor vehicle electrical system that can be used on automobiles, boats and the like.

In some types of motor vehicle electrical systems, the battery and other loads on the motor vehicle are supplied with electrical energy from an alternating current generator that has its output rectified by PN junction semiconductor diodes which may be, for example, silicon diodes. This system in general has been very satisfactory but care must be exercised in not overloading the diodes in a forward direction so as to inadvertently destroy them.

One problem encountered with the use of silicon diodes is the problem of correctly connecting the battery of the system with the diodes that rectify the output voltage of the A.C. generator. The correct connection is such that the diodes prevent the battery from discharging through the windings of the A.C. generator. If the battery is connected in a reverse manner, it will force current through the diodes in a forward direction and the diodes act substantially as a short circuit for the battery. This causes a high current to flow in a forward direction through the diodes with the result that one or more of them may be destroyed.

It accordingly is one of the objects of this invention to provide an electrical system wherein means are provided for preventing the connection of the battery in such a direction that forward current will be passed through the rectifying diodes.

A more specific object of this invention is to provide an electrical system wherein relay contacts connect one output terminal of the rectifying diodes with the battery and wherein the energizing circuit for the relay is arranged such that these contacts cannot be closed when the battery is connected in its reverse direction.

A further object of this invention is to provide an electrical system wherein an ignition switch controls the connection of the rectifying diodes and the battery through relay means and wherein a circuit is maintained through the relay coil of the relay means when the ignition switch is opened and when the generator is operating at high speed. This arrangement prevents a sudden removal of the load from the generator and serves to protect the diodes and other devices of the system against high voltage surges.

Further objects and advantages of the present invention will be apparent from the following description, reference being had to the accompanying drawings wherein a preferred embodiment of the present invention is clearly shown.

Figure 1:
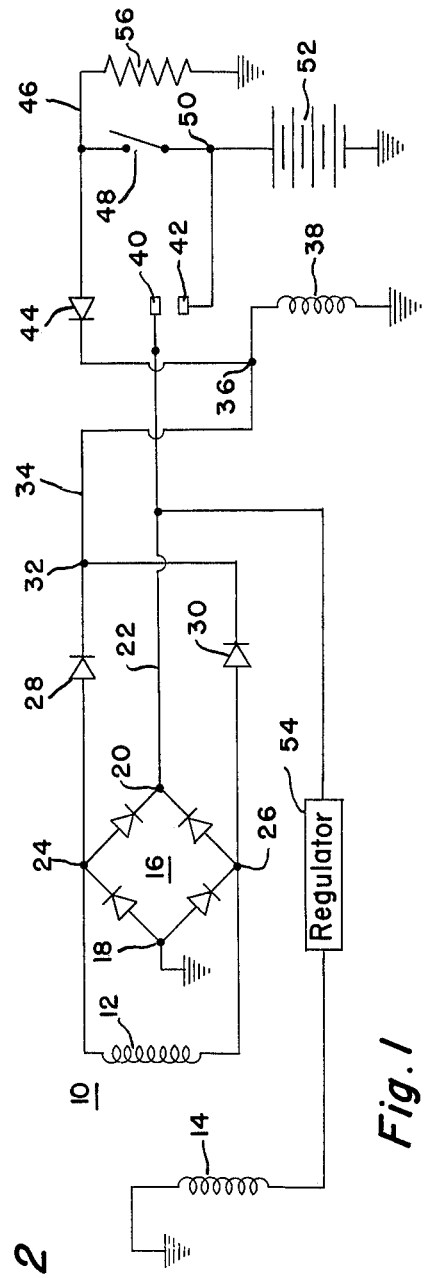
FIGURE 1 is a schematic circuit diagram of an electrical system made in accordance with this invention.

Referring now to the drawings and more particularly to FIGURE 1, the reference numeral 10 generally designates an alternating current generator which has a single-phase output winding 12 and a field winding 14. The generator may be of any well-known type wherein either the field winding or the output winding is rotatable or can be of a type wherein both the field and output windings are fixed. The output voltage that is generated in the output winding 12 is controlled by the amount of field current passing through the field winding 14 as is well-known to those skilled in the art.

The output winding 12 is connected with the A.C. input terminals of a single-phase bridge rectifier 16 which is formed of four PN junction semiconductor diodes that may be of the silicon type. One of the D.C. output terminals 18 of the bridge rectifier 16 is grounded whereas the other D.C. output terminal 20 is connected with a lead wire 22. The A.C. input terminals 24 and 26 of the bridge rectifier 16 are connected respectively with semiconductor diodes 28 and 30. The opposite side of the diodes 28 and 30 are connected together at junction 32.

The junction 32 is connected to junction 36 by a conductor 34. The junction 36 is connected to one side of a relay coil 38. The relay coil 38 forms a part of a relay which includes the movable contact 40 and the fixed contact 42. The contacts 40 and 42 are normally disengaged but will become engaged whenever the relay coil 38 is energized sufficiently. It is seen that one side of the relay coil 38 is grounded.

The junction 36 is connected to one side of a semiconductor diode 44, the opposite side of this diode being connected with lead wire 46. The lead wire 46 is connected to one side of a manually operable ignition switch 48, the opposite side of this switch being connected with junction 50.

The junction 50 is connected to one side of the battery 52 and with the fixed contact 42 of the relay. The shiftable contact 40 of the relay is connected with lead wire 22. A voltage regulator 54 of any conventional construction is connected between lead wire 22 and the field winding 14 and controls the field current of field winding 14 to maintain the output voltage of bridge rectifier 16 substantially constant. If desired the regulator may be connected between the field winding and ground. An electrical load designated by reference numeral 56 which may be an ignition load is connected between the lead wire 46 and ground.

When the ignition switch 48 is closed, the relay coil 38 will be energized from the battery 52 through a circuit which can be traced from junction 50, through the closed switch 48, through diode 44, through junction 36 and then through relay coil 38 to ground. It should be pointed out that the relay coil 38 would not be energized if the connection of the battery were reversed, that is, if the positive side of the battery were grounded rather than being connected to junction 50 as is shown in FIGURE 1. In the event that the wrong connection were made for the battery, it is seen that diode 44 would have prevented the energization of the relay coil 38 and therefore the contacts 40 and 42 would not have closed. This, of course, prevents the battery 52 from discharging through the diodes of bridge rectifier 16 in the event that the battery is connected in the wrong direction.

Assuming now that the battery is connected as shown in FIGURE 1, the relay contacts 40 and 42 will close and the field winding will be energized through the regulator 54. As the rotatable part of the generator 10 is now driven by an engine, the generator 10 will build up and an output voltage will be generated in the output winding 12. A D.C. output voltage will now appear between D.C. output terminals 18 and 20 to feed the battery through contacts 40 and 42 and to feed the field winding through the regulator 54. The other D.C. loads (not shown) on the motor vehicle will be fed from the D.C. output terminals 18 and 20.

Should the operator of the motor vehicle open the ignition switch 48 to cut off power to the ignition load 56 and therefore cut off ignition power to the engine, the generator will begin to slow down. The system of FIGURE 1 is arranged such that relay contactors 40 and 42 will not immediately open when the ignition switch 48 is opened. Thus, the relay coil 38 will be energized through diodes 28 and 30 and through conductor 34 when the output winding 12 has an output voltage. It thus is seen that the opening of the ignition switch 48 has no immediate effect on the energization of relay coil 38 since it will continue to be energized as long as the output winding 12 has a predetermined output voltage. The contacts 40 and 42 are thus maintained closed as the engine decelerates and as the output voltage of the generator 10 drops.

This arrangement prevents the load from suddenly being removed when the generator is operating at high speed. If this arrangement were not provided, it is possible that surge voltages could destroy the diodes of bridge rectifier 16. From the foregoing, it can be seen that the diodes 28 and 30 and the conductor 34 serve to prevent the sudden disconnection of the load and the bridge rectifier 16 when the generator is operating at high speed and the ignition switch is opened.

Figure 2:
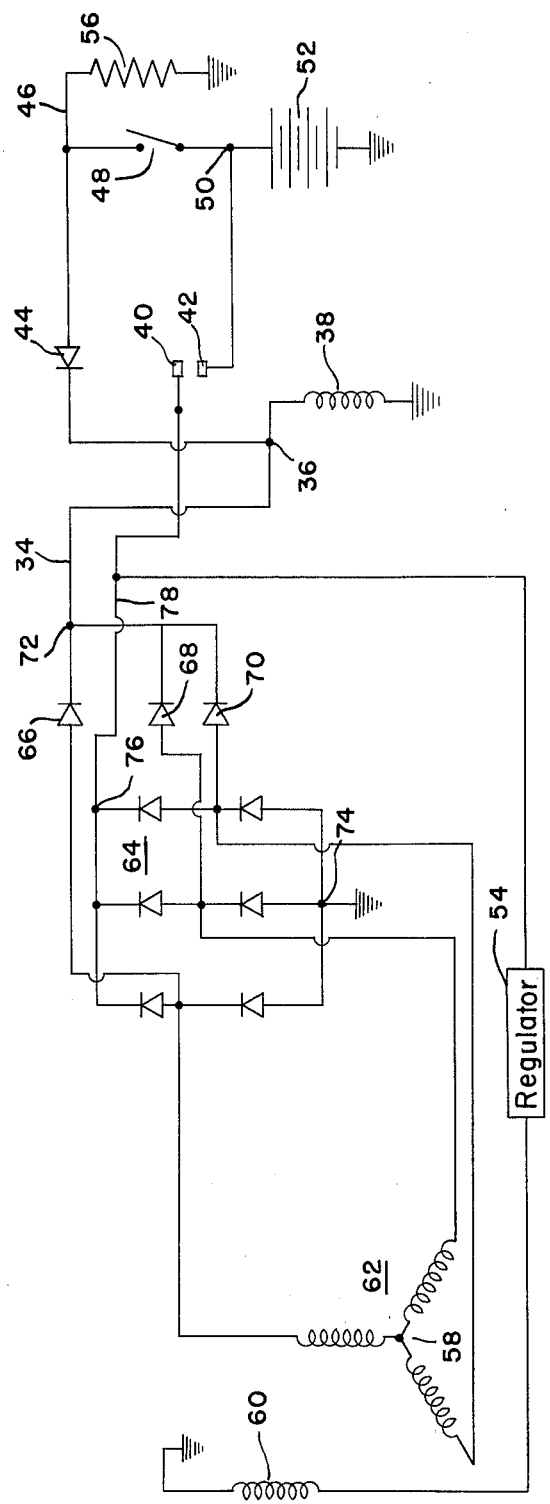
FIGURE 2 is a schematic circuit diagram of a system similar to FIGURE 1 but applied to a three-phase system rather than a single-phase system.

Referring now to FIGURE 2, a system is illustrated which is the same as the system of FIGURE 1 with the exception that a three-phase, Y-connected generator is shown which is rectified by a three-phase full wave bridge rectifier network. In FIGURE 2, the same reference numerals have been used as were used in FIGURE 1 to identify parts in FIGURE 2 which are the same as the parts shown in FIGURE 1.

In FIGURE 2, the three-phase, Y-connected output winding is designated by reference numeral 58. This output winding 58 and the field winding 60 comprise an A.C. generator which is generally designated by reference numeral 62. This generator may be of any well-known type and can be of the type wherein the field winding 60 is rotatable with respect to the output winding 58. It is immaterial as to what type of generator is used, however, and the generator can be of the brushless type if desired wherein a rotor member rotates with respect to fixed field and output windings.

The output winding 58 is connected with the A.C. input terminals of a three-phase full wave bridge rectifier 64 which is preferably comprised of six silicon diodes. The A.C. input terminals of bridge rectifier 64 are connected respectively with silicon diodes 66, 68 and 70 which are connected together at junction 72. The junction 72 is the equivalent of junction 32 in FIGURE 1.

One of the D.C. output terminals 74 of bridge rectifier 64 is grounded whereas the other D.C. output terminal 76 is connected with lead wire 78. It will be appreciated that lead wire 78 is the equivalent of lead wire 22 in FIGURE 1. A conventional voltage regulator 54 is connected between lead wire 78 and the field winding 60 to control the field current.

The operation of the system of FIGURE 2 is identical with operation of the system of FIGURE 1 and the description of this operation is therefore not repeated. It can be seen that the only difference between FIGURE 2 and FIGURE 1 is the use of a three-phase system rather than a single phase system.

While the embodiment of the present invention as herein disclosed constitutes a preferred form, it is to be understood that other forms might be adopted.

What is claimed is as follows:

1. In combination, an alternating current generator having an output winding, a bridge rectifier network having A.C. input terminals connected with said output winding and having D.C. output terminals, a battery, relay means having an actuating coil and switch contacts, means connecting said switch contacts between one of the D.C. output terminals of said bridge rectifier network and one side of said battery, a manually operable switch, a first energizing circuit for said relay actuating coil connected between one side of said battery and one side of said relay actuating coil including said manually operable switch and second diode means which are separate from said bridge rectifier network, and a second energizing circuit for said relay actuating coil connected with said A.C. output winding and said bridge rectifier network including third diode means separate from said bridge rectifier network.

2. In combination, an alternating current generator having an output winding and a field winding, a first rectifier means having D.C. output terminals connected with said output winding, a battery, a relay having switch contacts and an actuating coil, said switch contacts being interposed in a charging circuit connecting one of the D.C. output terminals of said first rectifier means and one side of said battery, said first rectifying means supplying charging current to said battery through said relay contacts when said relay contacts are closed, means connecting a junction located in a circuit between one of the D.C. output terminals of said first rectifier means and one side of said relay contacts with one side of said field winding, a manually operable switch, a circuit for energizing said relay actuating coil from said battery including said manually operable switch, said field winding being energized from said battery when said manually operable switch is closed and said relay contacts closed by current flow through said actuating coil from said battery through said manually operable switch, a second rectifying means connected with the output winding of said generator, and means connecting said second rectifying means to one side of said actuating coil, the output current of said second rectifying means maintaining said relay contacts closed after said manually operable switch has been opened.

3. The combination according to claim 2 wherein a diode separate from said first and second rectifying means is located in the circuit connecting the relay actuating coil and the manually operable switch.

4. The combination according to claim 2 where the generator has a three phase output winding.

5. An electrical system comprising, an alternating current generator having an output winding and a field winding, a battery, a first rectifying means connected with said output winding having D.C. output terminals, a relay having an actuating coil and switch contacts, a charging circuit connecting one side of said battery with one D.C. output terminal of said first rectifying means and including said switch contacts, said charging circuit being closed when said actuating coil is energized, a circuit for energizing said actuating coil from said battery including a manually operable switch means, means connecting one side of said relay switch contacts and one D.C. output terminal of said first rectifying means with one side of said field winding whereby said field winding is energized from the battery through said relay contacts when said manually operable switch is closed, second rectifying means connected with said output winding of said generator and means connecting said second rectifying means with said actuating coil of said relay whereby said actuating coil can be energized from said second rectifying means when said manually operable switch is opened to break the circuit to said actuating coil of said relay from said battery.

6. The electrical system according to claim 5 where the manually operable switch controls an ignition load on a motor vehicle.

7. The combination according to claim 5 where the manually operable switch controls an ignition load on a motor vehicle and wherein a diode separate from said first and second rectifying means is provided which is connected between the manually operable switch and the actuating coil of the relay.

8. In combination, an alternating current generator having an output winding and a field winding, a battery, a rectifier network connected with said output winding having D.C. output terminals, a battery charging circuit connected with one of the D.C. output terminals of said rectifier network, a relay having an actuating coil and a pair of switch contacts, said charging circuit including said switch contacts, a circuit for energizing said actuating coil from said battery including a manually operable switch, said circuit including a diode whereby said actuating coil can only be energized when the battery is connected to said charging circuit with the correct polarity, a circuit separate from the D.C. output terminals of said rectifier network and energized by the output winding of said generator for supplying current to the actuating coil of said relay when said output winding has an output voltage, said circuit maintaining said relay contacts closed to maintain a connection between said one of the D.C. output terminals of the rectifier network and one side of said battery after said manually operable switch has been opened and means connecting said field winding with said one D.C. output terminal of said rectifier network.

9. In combination, an alternating current generator having an output winding and a field winding, a rectifier network connected with said output winding having D.C. output terminals, a battery, a charging circuit for connecting one of the D.C. output terminals of said rectifier circuit and said battery, switch means interposed in said charging circuit for opening and closing said charging circuit, control means for controlling the operation of said switch means, a first circuit for energizing said control means from said battery including a manually operable switch and a diode, said diode preventing energization of said control means when the polarity of the battery is reversed with regard to the charging circuit to thereby prevent closing of said charging circuit when the polarity of the battery is reversed, a second circuit energized by the output winding of said generator for energizing said control means to maintain said charging circuit closed after said manually operable switch has been opened and means connecting said one of said D.C. output terminals of said rectifier circuit with said field winding.

References Cited by the Examiner
UNITED STATES PATENTS

| 2,067,420 | 1/1937 | Seeger et al. | 320—25 X |
| 2,509,239 | 5/1950 | Mattheyses | 320—25 X |
| 2,683,850 | 7/1950 | Weber et al. | 320—25 X |
| 3,051,887 | 8/1962 | Lind | 320—25 |
| 3,062,998 | 11/1962 | Medlar | 320—25 X |

LLOYD McCOLLUM, *Primary Examiner.*